No. 756,632. Patented April 5, 1904.

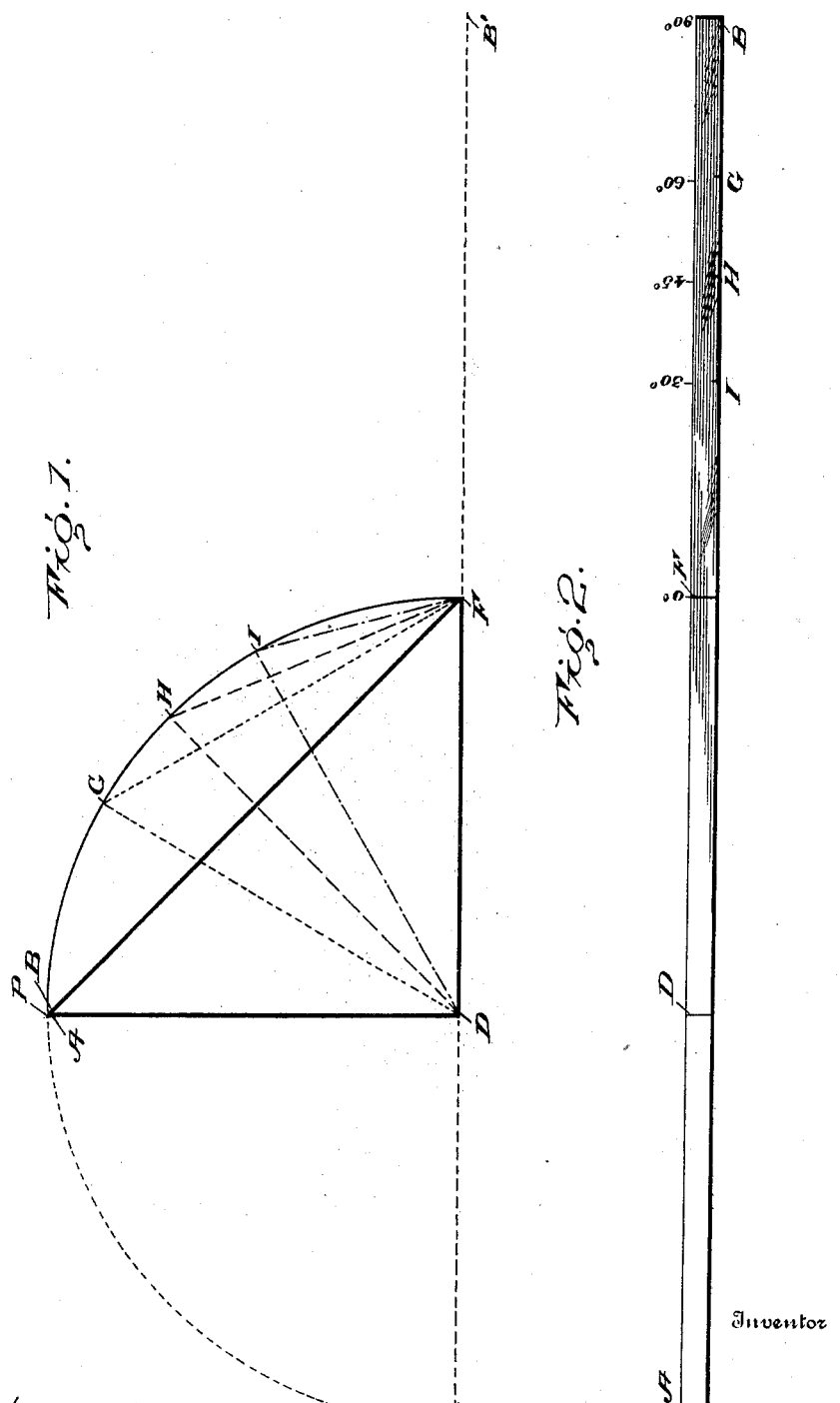

UNITED STATES PATENT OFFICE.

GEORGE IRA HERRICK, OF WHEATON, ILLINOIS.

PROTRACTOR-TAPE.

SPECIFICATION forming part of Letters Patent No. 756,632, dated April 5, 1904.

Application filed August 31, 1903. Serial No. 171,406. (No model.)

*To all whom it may concern:*

Be it known that I, GEORGE IRA HERRICK, a citizen of the United States, residing at Wheaton, in the county of Dupage and State of Illinois, have invented new and useful Improvements in Protractor-Tapes, of which the following is a specification.

My invention relates to measuring-tapes, and more especially to protractor-tapes by means of which angles may be laid off or measured.

The object of my invention is to provide a tape for the use of the surveyor in fieldwork and for other similar uses by which the labor and time consumed in taking field-notes, especially in angling-work, are considerably lessened and shortened.

More especially, the present invention is directed to the measuring of angles or laying the same off by means of a tape adapted to this purpose by the construction to be hereinafter more particularly set forth. This tape is so constructed as to give the angles desired directly and without the need of the ordinary surveying instruments used in laying off angles or in obtaining angles between objects at a distance and a base-line.

Other uses and purposes of this invention will be readily apparent from the following description of the device.

The invention is illustrated in the accompanying drawings, in which—

Figure 1 represents a plan view of the device, while Fig. 2 shows the device in use and the method of employing the same in actual use.

Referring more particularly Fig. 1, A and B indicate the ends of the tape, which may be of ordinary construction and may be attached at one end to a casing or holder for convenience in any ordinary manner. The tape in its length is divided into three sections or divisions AD, DF, and FB. The sections AD and DF are equal, each one being equal to the length of a radius of a circle A'PF. The portion FB is graduated with a scale of chords of an arc with a radius equal to the distance AD or DF, and upon this portion are chords of angles reading from zero degrees at F to ninety degrees at B. It is upon this portion that the angles in actual work are read, and though in Fig. 1 only angles of thirty, forty-five, and sixty degrees are shown on the graduated portion, yet it is obvious that further graduation is intended and may be made for angles of greater or less degree; but it is not thought necessary to show all the angles between the limits of zero and ninety degrees.

The present tape is made upon the following measurements: The length from A to B is taken to represent one hundred units of length, feet, or meters, and the distance AD is 29.289314 per cent. of this total distance, constituting the length of the radius of the circle A'FP, upon which as a unit is based the scale of chords to which the portion FB is graduated to give angles.

In Fig 2 is set out the invention in use for determining angles. In operation the portion DF is placed, as shown, on the base-line A'B' and there secured by means of pins or otherwise. Assuming that the angle of an object at P is desired, the end A of the tape is led thereto and the portion FB swung around until the end B rests on the other end A at P. From this position taken by the tape on reference to the graduated portion FB it is seen that the angle ADF of the object at P is ninety degrees to the base-line. This same operation is repeated in taking the angles of the points G, H, and I, where the position of the tape is indicated in dotted lines, and it is found that these points upon reference to the graduations of FB gives angles of sixty, forty-five, and thirty degrees, respectively. To measure angles in the other quadrant, it is only necessary to reverse the position of the tape, placing F at A', and repeat the above operation.

It can be readily seen that this device may be employed for laying off angles, as well as for measuring and ascertaining the same, the angles being read directly upon the graduated portion, which forms the chord for all angles laid off.

Although constructed upon the basic unit of a radius 29.289314 units in length, the whole tape being one hundred units in length, the two sections AD and DF each being 29.289314 per cent. of the length of the tape, it is not intended that I limit myself to these measurements, as variations may be introduced; but these present ratios have been found most practicable, and hence are herein given.

What is desired to be protected by Letters Patent and what I claim is—

1. A flexible protractor-tape comprising three divisions, one of said divisions being graduated to a scale of chords and numbered to show the angles which such chords subtend at the center of a given circle, the other two divisions being each equal in length to the radius of the circle to the scale of whose chords said first-named division is graduated, the said graduated division being contiguous to one end of the tape, substantially as described.

2. A flexible tape comprising three divisions, two being adapted to serve as the base and leg of a triangle, and the third being adapted to serve as the third side, being graduated into angles to a scale of chords and numbered to show the angles which such chords subtend at the center of a given circle which circle has a radius equal to one of said first-named divisions, whereby angles may be read direct from said graduated division, the latter division being contiguous to one end of the tape, substantially as and for the purpose set forth.

3. A flexible tape made in one piece throughout its entire length, comprising three divisions, two of said divisions being equal in length and ungraduated, the third division being graduated to a scale of chords and numbered to show the angles which such chords subtend at the center of a given circle, whereby angles may be read directly thereon, the said graduated division being contiguous to one end of the tape, substantially as described.

4. A flexible tape made in one piece throughout its entire length, comprising three divisions, two of said divisions being equal in length, each being equivalent to a radius of a given circle, and ungraduated, the third division being graduated to a scale of chords and numbered to show the angles which such chords subtend at the center of a given circle and longer than the said ungraduated divisions, whereby angles may be read directly from the graduated division, the latter division being contiguous to one end of the tape, substantially as described.

In testimony whereof I have signed my name to this specification in the presence of two subscribing witnesses.

GEORGE IRA HERRICK.

Witnesses:
R. P. HERRICK,
SAMUEL HERRICK.